DIGITAL MAGNETIC TAPE RECORDING SYSTEM

Filed April 27, 1966

INVENTOR.
Robert E. Schoeneman
BY
Lane, Aitken, Dunner & Ziems
ATTORNEYS

DIGITAL MAGNETIC TAPE RECORDING SYSTEM

Filed April 27, 1966 Sheet 3 of 3

INVENTOR.
Robert E. Schoeneman
BY
Lane, Aitken, Dunner & Ziems
ATTORNEYS

United States Patent Office 3,454,930

Patented July 8, 1969

3,454,930

DIGITAL MAGNETIC TAPE RECORDING SYSTEM

Robert E. Schoeneman, East Setauket, N.Y., assignor to Potter Instrument Company, Inc., Plainview, N.Y., a corporation of New York Filed Apr. 27, 1966, Ser. No. 545,669

Int. Cl. G06f *3/04*

U.S. Cl. 340—172.5 16 Claims

ABSTRACT OF THE DISCLOSURE

This specification discloses a digital magnetic tape recording system in which the digital data is stored in a buffer register in the form of a series of shift registers. The information is entered into one end of the series of shift registers and then is shifted down to the other end. When the last two shift registers in a series are full of data, the magnetic tape is started and the information is shifted out of the last shift register and recorded on the tape. When the second to the last shift regiser becomes empty, the tape is stopped.

This invention relates to digital magnetic tape recording and more particularly to a system of the type designed to record digital characters which may be presented at random times.

Digital tape transports of the prior art designed to record characters which may be presented at random times are incremental in their operation; that is when a digital character is presented to the tape transport, the tape transport advances its tape one increment and records the character. Thus, the tape is started and stopped each time a new character is presented and in this manner the tape transport is able to record the characters presented at random times. Because the tape must be stopped and started between digital characters, the rate at which incremental tape transports can accept information is limited to about 500 characters per second.

The tape transport of the present invention improves on the performance of the incremental tape transports in that it is able to accept and record digital information at a rate of about 6,000 characters per second and yet it is able to accept and record characters that are presented at random times.

In accordance with the present invention the information to be recorded is first stored in a buffer storage. When a predetermined number of characters have been stored in the buffer storage, the tape transport starts to advance the tape and records information in the order of which it was stored. As the information is recorded, it is read out of the buffer storage. When the number of characters in the buffer storage drops below a predetermined value, the tape is decelerated to a stop. During the periods that the tape is being accelerated and decelerated, characters are read out of the buffer storage and recorded on the tape so that no undesired gaps occur in the information recorded on the tape. To make this feature possible, the number of characters in the buffer storage, which controls the initiation of the deceleration of the tape to a stop, is made large enough to provide enough characters to be recorded during the deceleration period. Similarly, the number of characters in the buffer storage, which controls the starting of the tape acceleration, is made large enough to permit the tape to be accelerated to full speed before deceleration is initiated.

Accordingly, an object of the present invention is to provide an improved tape transport of the type which accepts and records information which may be presented at random times.

Another object of the present invention is to provide a tape transport of the type which can record randomly occurring information and which will accept and record the information at a high rate.

A further object of the present invention is to provide a tape transport of the type which can record randomly occurring information at a high rate without any gaps between the information recorded on the tape.

Further objects and advantages of the present invention will become readily apparent as the following detailed description of the invention unfolds and when taken in conjunction with the drawings wherein:

FIG. 1 schematically illustrates the tape transport of the present invention;

Figure 1:
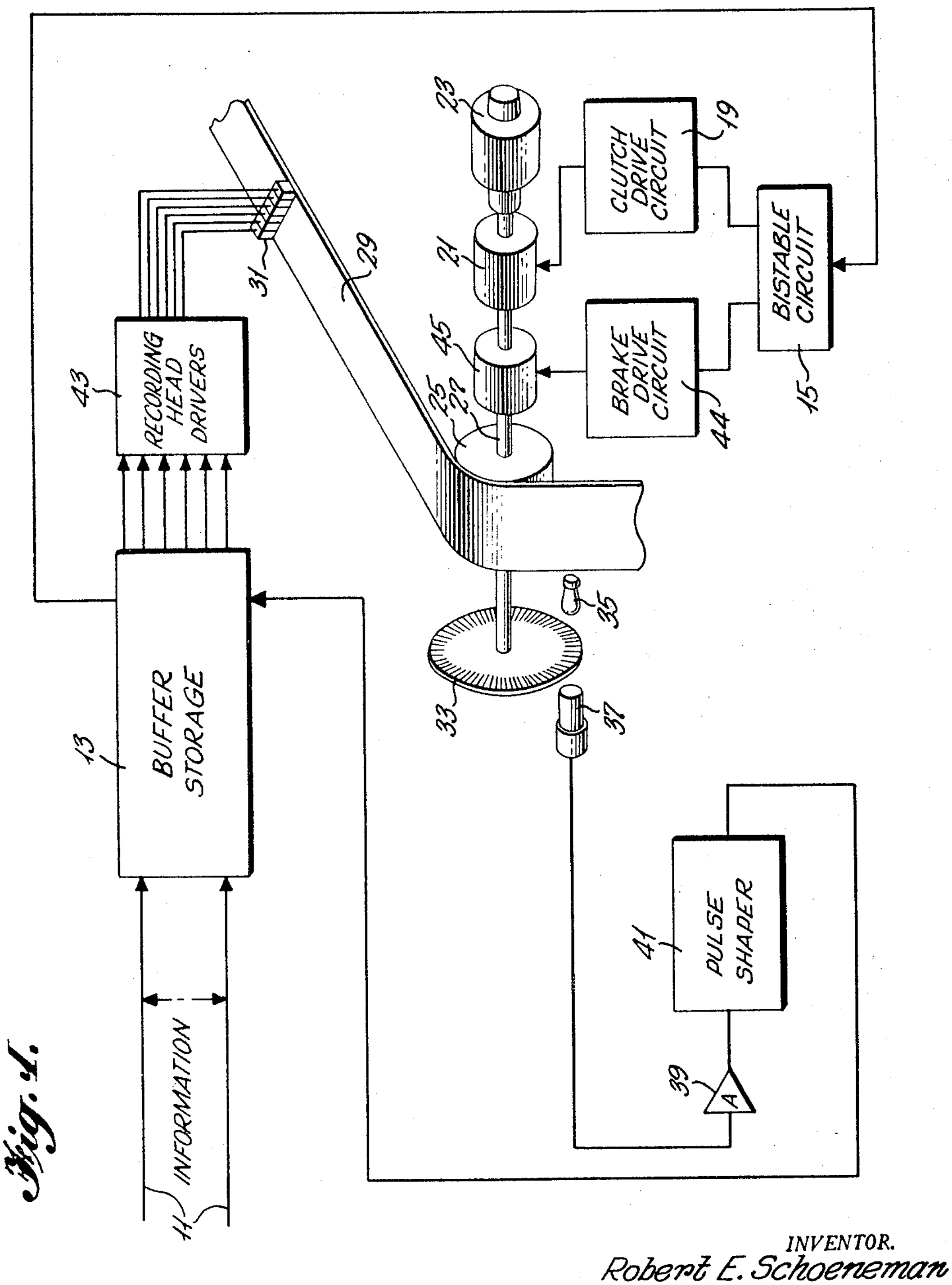

As shown in FIG. 1 binary characters to be recorded are presented in parallel on a plurality of input lines 11 to the buffer storage unit 13 of the system. In the specific embodiment of the invention each character is made up of six binary bits represented by the signals applied in parallel to the input lines 11. Each character presented on the lines 11 may occur at any random time.

As the characters are presented they are stored in the buffer storage unit 13. When the number of characters stored in the buffer storage reaches a predetermined value, which in the preferred embodiment is 42 characters, the buffer storage unit 13 applies a "go" signal to a bistable circuit 15. In response to receiving this go signal, the bistable circuit will enable a clutch drive circuit 19, which will then energize a clutch 21. Upon being energized the clutch 21 will couple the output shaft of a motor 23 to a magnetic tape drive capstan 25 by means of a shaft 27. The motor 23 will be energized so as to be continuously rotating. Accordingly, the energization of the clutch 21 will cause the capstan 25 to be accelerated to the speed of the motor 23. As the capstan rotates it drives a magnetic tape 29 past a set of magnetic recording heads 31.

Mounted on the shaft 27 is a tone wheel 33, which comprises a transparent disc having incremental markings distributed at regular intervals around its periphery. A light source 35 is provided to direct a beam of light through the transparent disc 33 to irradiate a photocell 37. Each time one of the incremental markings on the disc 33 passes between the light source 35 and the photocell 37, it will cause a pulse to be generated by the photocell. Thus, as the capstan 25 drives the tape 29 past the heads 31, the photocell 37 will generate pulses representing the movement of the magnetic tape. The incremental markings are placed on the tone wheel 33 so that the photocell 37 will generate a pulse for every 0.005 inch that the tape 29 is advanced; or in other words, the photocell 37 will generate 200 pulses per inch of the tape 29.

The pulses produced by the photocell 37 are amplified by an amplifier 39 and then applied to a pulse shaper 41, which shapes the applied pulses from the amplifier and applies them to the buffer storage unit 13. Each pulse applied to the buffer storage unit 13 by the pulse shaper 41 will cause a 6 bit binary character to be read out of the buffer storage 13 and be applied to recording head drivers 43. The recording head drivers 43, in response to each applied binary character from the buffer storage unit 13, apply signals to the recording heads 31 to record the applied character. Thus, as the magnetic tape 29 is advanced past the recording heads 31, binary characters will be recorded at a rate of 200 characters per inch.

Since the tone wheel will cause the photocell 37 to start generating pulses as soon as the capstan 25 and the tape 29 start to move, binary characters will be read out of the buffer storage unit 13 and recorded on the tape during the period that the capstan is being accelerated up to the speed of the motor 23. As the characters are being read out of the buffer storage unit 13, the number of characters in the buffer storage unit 13 will be reduced until the number of characters in the buffer storage unit reaches a predetermined value, at which time the buffer storage unit 13 will change the go signal applied to the bistable circuit 15 to a stop signal. In response to receiving the stop signal, the bistable circuit 15 will remove the enabling signal from the clutch drive circuit 19, whereupon the clutch drive circuit 19 will deenergize the clutch 21, which will disengage. The bistable circuit 15 will also apply an enabling signal to a brake-drive circuit 44 in response to receiving the stop signal. The brake-drive circuit 44, in response to receiving the enabling signal, will energize a brake 45, which upon being energized will act upon the shaft 27 to decelerate the capstan 25 and the tape 29 to a stop. Thus, when the number of characters in the buffer storage unit 13 has dropped to a minimum value, which in the preferred embodiment is 21 characters, the capstan 25 and tape 29 will be decelerated to a stop.

During the period when the tape is being decelerated to a stop, the tone wheel 33 will continue to rotate and the photocell 37 will continue to produce pulses at a rate of one pulse for every 0.005 inch of movement of the tape 29. Accordingly, characters will be recorded during the period that the capstan is being decelerated to a stop. Accordingly, no gaps between the characters recorded on the tape 29 will occur as a result of the system not recording during the acceleration and deceleration periods.

The value to which the number of characters in the buffer storage unit 13 must drop to cause the buffer storage unit 13 to apply a stop signal to the bistable circuit 15 is selected to be high enough so that enough characters remain in the buffer storage unit 13 to be recorded during the time that the tape is being decelerated to a stop. In the preferred embodiment this number is 21 characters. Similarly, the number of characters which must be stored in the buffer storage unit before the buffer storage unit 13 will change the signal applied to the bistable circuit 15 from a stop signal to a go signal is selected to be high enough so that enough characters are available to be recorded to permit the capstan 25 and the tape 29 to be fully accelerated to the speed of the motor 23 before the number of characters in the buffer storage unit 13 again drops down to the value which will cause the buffer storage unit 13 to change back the signal applied to the bistable circuit 15 from a go signal to a stop signal. In the preferred embodiment, this number of characters which must be stored in the buffer storage unit 13 before the acceleration of the tape 29 is started is selected to be 42 characters.

Figure 2:
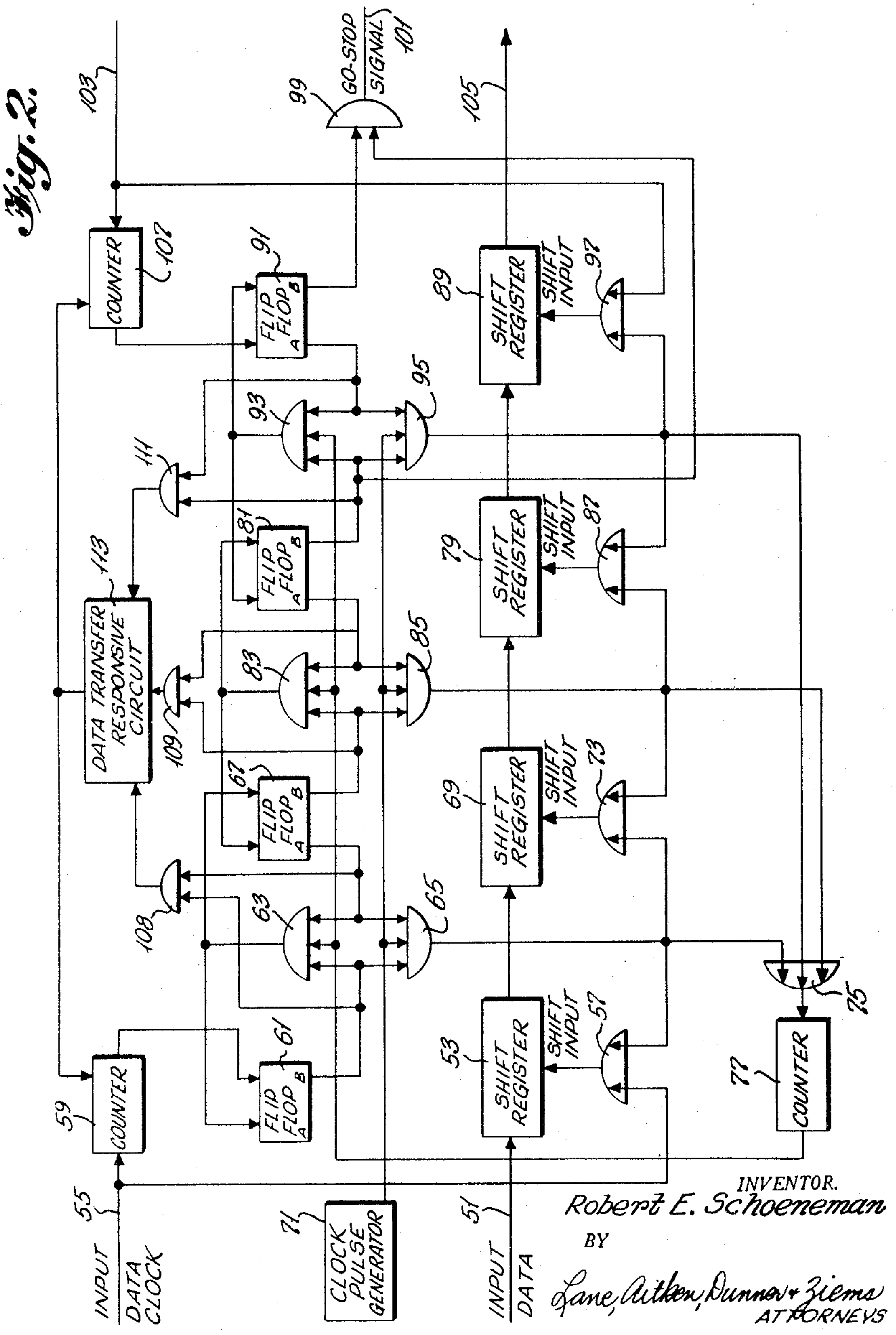
FIG. 2 is a block diagram of the buffer storage of the present invention.

FIG. 2 illustrates the buffer storage unit of the tape transport of the present invention for one channel of input data. Similar circuitry is provided for each of the other 5 channels. As shown in FIG. 2 the input data is applied to the buffer register over an input channel 51 to a shift register 53. With each binary bit applied on a channel 51 a clock pulse is applied to the buffer storage unit on channel 55. The clock pulses applied on channel 55 pass through an OR gate 57 to the shift input of the shift register 53 and cause the shift register 53 to shift one space forward to make room to store the binary bit being applied on the input channel 51. The shift register 53 is a 21 stage shift register and when 21 binary bits have been stored in the shift register from channel 51, the shift register 53 will be full.

Each clock pulse on channel 55 is also applied to a counter 59. When the counter 59 reaches a count of 21 indicating that the shift register 53 is full, it recycles to zero and applies a pulse to a flipflop 61 to set the flipflop 61 in its B state. The flipflop 61 signals the condition of the shift register 53 and when it is switched to its B state it signals that the shift register 53 has been filled and is ready to transfer the binary bits stored therein. When the flipflop 61 is in its B state it will apply an enabling signal to a gate 63 and a gate 65. The gates 63 and 65 will also receive an enabling signal from a flipflop 67 whenever the flipflop 67 is in its A state. The flipflop 67 will be in its A state to signal that a shift register 69, which like the shift register 53 has a capacity of 21 bits, is empty and ready to receive binary data from the shift register 53. Pulses are applied to the gate 65 from a clock pulse generator 71 and when the gate 65 receives enabling signals from both the flipflops 61 and 67 it will be enabled to pass the applied clock pulses. The clock pulses upon passing through the gate 65 pass through the OR gate 57 to the shift input of the shift register 53. The pulses passing through the gate 65 are also applied through an OR gate 73 to the shift input of the shift register 69. When pulses are applied in this manner to the shift inputs of both the shift registers 53 and 69, the binary data stored in the shift register 53 will be shifted out of the shift register 53 and into the shift register 69.

The clock generator 71 generates pulses at a 250 kilocycle rate so that the data stored in the shift register 53 is emptied out of the shift register 53 and stored in the shift register 69 in 84 microseconds. The time it takes to transfer data between shift registers is less than the minimum time interval between binary bits applied on channel 51 so there is no danger of an input bit being applied on channel 51 while data is being transferred from the shift register 53 to the shift register 69.

The clock pulses passing through the gate 65 also pass through an OR gate 75 to a counter 77, which counts the applied clock pulses and upon reaching a count of 21 recycles to zero. Upon recycling to zero the counter 77 produces an output pulse, which will be applied to the gate 63. The gate 63 will be enabled to pass a pulse applied from the counter 77 only if it is receiving enabling signals from both the flipflops 61 and 67, that is only if the flipflop 61 is in its B state and the flipflop 67 is in its A state. While data is being shifted out of the shift register 53 and into the shift register 69, the flipflop 61 will be in its B state and the flipflop 67 will be in its A state. Thus, when the counter 77 reaches a count of 21, as a result of all 21 bits having been shifted from the shift register 53 to the shift register 69, the gate 63 will be enabled and the pulse produced by the counter 77 will pass through. Upon passing through the gate 63 the pulse from the counter 77 is applied to the flipflop 61 to switch it back to its A state and to the flipflop 67 to switch the flipflop 67 to its B state. The flipflop 61 will then signal that the shift register 53 has been emptied and the flipflop 67 will signal that the shift register 69 has been filled.

After the 21 bits of data have filled the shift register 69, they are ready to be shifted into a 21 stage shift register 79. A flipflop 81 is provided to indicate the condition of the shift register 79 and will be switched to its A state whenever the shift register 79 is emptied and will be switched to its B state whenever the shift register 79 is filled.

When the flipflop 67 is in its B state indicating that the shift register 69 has been filled, it will apply an enabling signal to a gate 83 and to a gate 95. The flipflop 81 will also apply an enabling signal to the gates 83 and 85 whenever the flipflop 81 is in its A state indicating that the shift register 79 has been emptied. The clock pulses produced by the clock pulse generator 71 are applied to the gate 85, and whenever the gate 85 receives enabling signals from both flipflops 67 and 81 indicating that the shift register 69 has been filled and the shift register 79 has been emptied, the gate 85 will be enabled so that the applied clock pulses will pass through the gate 85. Upon passing through the gate 85, the 250 kilocycle clock pulses are applied through the OR gate 73 to the shift input of the shift register 69 and through an OR gate 87 to the shift input of the shift register 79. As a result of the pulses applied to the shift inputs of both the shift registers 69 and 79, the 21 bits stored in the shift register 69 will be very quickly shifted out of the shift register 69 and into the shift register 79 filling it. The clock pulses passing through the gate 85 are also applied through the OR gate 75 to the counter 77 so that when the shift register 79 is filled the counter 77 will produce an output pulse which will pass through the enabled gate 83 to switch the flipflop 67 back to its A state and to switch the flipflop 81 to its B state.

When the shift register 79 has been filled, the data stored in the shift register 79 is ready to be transferred to a final 21 stage shift register 89. A flipflop 91 is provided to signal the condition of the shift register 89. When the shift register 89 has been filled, the flipflop 91 will be switched to its B state to indicate this condition and when the shift register 89 has been emptied the flipflop 91 will be switched to its A state to signal this condition.

The 21 binary bits are transferred from the shift register 79 to fill the shift register 89 under the control of the flipflop 81 and the flipflop 91 in the same manner that data is transferred from the shift register 53 to shift register 69 and from the shift register 69 to the shift register 79 under the control of the flipflops corresponding to these shift registers. For this purpose gates 93 and 95 are provided to be enabled only when the flipflop 81 is in its B state and the flipflop 91 is in its A state. Clock pulses from the clock pulse generator 71 are applied to the gate 95, and when the gate 95 is enabled the clock pulses pass through the gate 95 and then through the OR gate 87 to the shift input of the shift register 79 and through an OR gate 97 to the shift input of the shift register 89. Thus, the clock pulses applied to the shift inputs of shift registers 79 and 89 will effect the transfer of the data stored in the shift register 79 to the shift register 89.

The clockpulses passing through the gate 95 are applied through the OR gate 75 to the counter 77, which counts the applied pulses. When the counter 77 reaches a count 21 indicating that all of the 21 bits stored in the shift register 79 have been transferred to the shift register 89, the counter 77 will produce an output pulse, which will pass through the enabled gate 93 to switch the flipflop 81 to its A state and to switch the flipflop 91 to its B state so that the flipflop 81 signals that the shift register 79 has been emptied and the flipflop 91 signals that the shift register 89 has been filled.

In this manner the binary data is transferred from the input shift register 53 to the output shift register 91 in the buffer storage unit.

When the shift register 79 has been emptied and the flipflop 81 has been switched to its A state, the flipflop 81 will again apply an enabling signal to the gates 83 and 85 signaling that the shift register 79 is ready to receive more binary data from the shift register 69. Accordingly, when the shift register 69 fills up again with binary data, the data will be shifted to the shift register 79. Similarly, when the shift register 69 has been emptied and the flipflop 67 has been switched to its A state, the flipflop 67 will again apply an enabling signal to the gates 63 and 65 signaling that the shift register 69 has been emptied and is ready to receive data from the shift register 53. Accordingly, when the shift register 53 again fills with the data, the data will be transferred to the shift register 69. In this manner the shift registers of the buffer storage unit are filled with the input data applied on line 51.

Whenever the flipflop 81 is in its B state, it applies an enabling signal to a gate 99. Whenever the flipflop 91 is in its B state it applies an enabling signal to the gate 99. Thus, the gate 99 will receive enabling signals from both the flipflops 81 and 91 when both the shift registers 79 and 89 have been filled. When the gate 99 receives enabling signals from both the flipflops 81 and 91, it will produce the go signal on an output channel 101, which is the signal that is applied from the buffer storage 13 to the bistable circuit 15 shown in FIG. 1. Whenever the gate 99 does not receive an enabling signal from both the flipflops 81 and 91, it will produce the stop signal on the output channel 101. Thus, the go signal will be produced on the output channel 101 whenever both of the flipflops 81 and 91 are in their B states signaling that the shift registers 79 and 89 have both been filled and will produce a stop signal on the output channel 101 when either of the flipflops 81 or 91 is in its A state indicating that one of the shift registers 81 or 91 has been emptied.

When the go signal is produced on the output channel 101, as pointed out above with respect to the discussion regarding FIG. 1, the clutch 21 will be engaged to initiate the acceleration of the capstan 25 and the tape 29 up to the speed of the motor 23. As the disc 33 begins to rotate it will cause pulses to be produced by the photocell 37, which pulses, after being amplified by the amplifier 39 and shaped by the pulse shaper 41, are applied to the buffer storage unit 13. These pulses are applied to the buffer storage unit on input channel 103, as shown in FIG. 2.

The pulses applied on input channel 103 pass through the OR gate 97 to the shift input of the shift register 89 to cause the binary data stored in the shift register 89 to be shifted out to output channel 105. The output channel 105 is one of the output channels of the buffer storage unit 13, as shown in FIG. 1, applied to the recording head drivers 43. Thus, as the pulses are applied to the shift register 89 from the input channel 103, the binary data stored in the shift register 89 is shifted out of the shift register 89 and caused to be recorded on the magnetic tape 29.

The pulses produced on channel 103 are also applied to a counter 107, which counts the applied pulses and upon reaching a count of 21 recycles to zero and applies a pulse to the flipflop 91 to set the flipflop 91 back to its A state. Thus, the flipflop 91 will be set back to its A state when the shift register 89 has been emptied of data by the pulses applied on input channel 103. If the shift register 79 is full when the shift register 89 becomes empty, the gate 95 will be enabled so that pulses from the clock pulse generator 71 will quickly shift the data from the shift register 79 to the shift register 89. Because the clock pulses 71 are produced at a 250 kilocycle rate, the shifting of the data from the shift register 79 into the shift register 89 will all occur during the space between two pulses applied on input channel 103 so that the data can be continued to be read out onto channel 105 without interruption, even though the shift register 89 is emptied and refilled during the reading out.

If the shift registers 69 and 79 are both filled when the shift register 89 is emptied, then when the contents of the shift register 79 are shifted into the shift register 89, the contents of the shift register 69 immediately thereafter will be transferred into the shift register 79. During this shift of data the output signal of the gate 99 will temporarily change to the stop signal which would tend to make the bistable circuit switch states to energize the brake drive circuit 44 and deenergize the clutch drive circuit 19. However, under such circumstances, the stop signal will be produced on channel 101 for only momentarily and the time constant of the bistable circuit 15 is made slow enough that this momentary stop signal will not cause the bistable circuit 15 to switch states. Accordingly, the motor 23 will continue to drive the capstan 25 without interruption during the transfer operation.

On the other hand, if the shift register 69 is not filled when the shift register 89 becomes emptied, then when the contents of the shift register 79 are transferred to the shift register 89, the flipflop 81 will be switched to, and remain in, its A state. Accordingly, the flipflop 81 will no longer apply an enabling signal to the gate 99 so that the output from the gate 99 changes to a stop signal. As a result, the bistable circuit 15 will deenergize the clutch drive circuit 19 and energize the brake drive circuit 17 to decelerate the capstan 25 and the tape 29 to a stop. The tape will be brought to a stop before all the 21 bits have been read out of the shift register 89 and recorded on the tape.

In order for the buffer storage to operate properly, the flipflop 61 must not be switched to its B state during the time that data is being transferred from one shift register to another in the buffer storage unit. Similarly, the flipflop 91 must not be switched to its A state during the time that data is being transferred from one shift register to another. For example, if while data were being transferred from the shift register 79 to the shift register 89, the flipflop 61 were switched to its B state as a result of the shift register 53 becoming filled with data, and the shift register 69 were empty, then, in the middle of the transfer of data from the shift register 79 to the shift register 89, data would begin to be transferred from the shift register 53 to the shift register 69. However, when all of the data would have been transferred out of the shift register 79, the couner 77 would produce an output pulse, which would pass through the enabled gate 63 and switch the flipflop 61 back to its A state and the flipflop 67 back to its B state before all of the data would have been shifted out of the shift register 53. As a result, some of the data would be left in the shift register 53 and some in the shift regiser 69. Likewise, if the flipflop 91 were switched to its A state during the time data were being transferred from the shift register 53 to the shift register 69 and the shift register 79 were filled, then, data would begin to be transferred from the shift register 79 to the shift register 89 in the middle of the transfer of data from the shift register 53 to the shift register 69. Accordingly, the counter 77 would produce an output pulse before all of the data would have been transferred from the shift register 79 to the shift register 89 and the transfer of the data from the shift register 79 to the shift register 89 would be terminated before all of the data would have been transferred.

To prevent any such malfunctioning of the system, the flipflop 61 applies an enabling signal to a gate 108 whenever the flipflop 61 is in its B state. The gate 108 will also receive an enabling signal from the flipflop 67 whenever the flipflop 67 is in its A state. Similarly, a gate 109 is connected to receive an enabling signal from the flipflop 67 whenever the flipflop 67 is in its B state and enabling signal from the flipflop 81 whenever the flipflop 81 is in its A state. A third gate 111 is connected to receive an enabling signal from the flipflop 81 whenever the flipflop 81 is in its B state and to receive an enabling signal from the flipflop 91 whenever the flipflop 91 is in its A state.

Whenever the gate 108 receives enabling signals from both of the flipflops 61 and 67, it will apply an enabling signal to a data transfer responsive circuit 113. Similarly, whenever the gate 109 receives enabling signals from both of the flipflops 67 and 81, it will apply an enabling signal to the data transfer responsive circuit 113; and whenever the gate 111 receives enabling signals from both the flipflops 81 and 91, it will apply an enabling signal to the data transfer responsive circuit 113. Thus, when data is being transferred from the shift register 53 to the shift register 69, the gate 108 will apply an enabling signal to the data transfer responsive circuit. Likewise, when data is being transferred from the shift register 69 to the shift register 79, the gate 109 will apply an enabling signal to the data transfer responsive circuit; and, when data is being transferred from the shift register 79 to the shift register 89, the gate 111 will apply an enabling signal to the data transfer responsive circuit. Thus, whenever data is being transferred from one shift register to another, one of the gates 108, 109 or 111 will apply an enabling signal to the data transfer responsive circuit.

When the data transfer responsive circuit receives an enabling signal from at least one of the gates 108, 109 or 111 it will control the counters 59 and 107 to delay any output pulse as a result of the count reaching a count of 21 until after the data transfer between the shift registers has been completed. Accordingly, the flipflop 61 will not be switched to its B state until after the completion of the data transfer and the flipflop 91 will not be switched to its A state until after the completion of the data transfer. In this manner the potential malfunctioning of the circuit is prevented.

Figure 3:
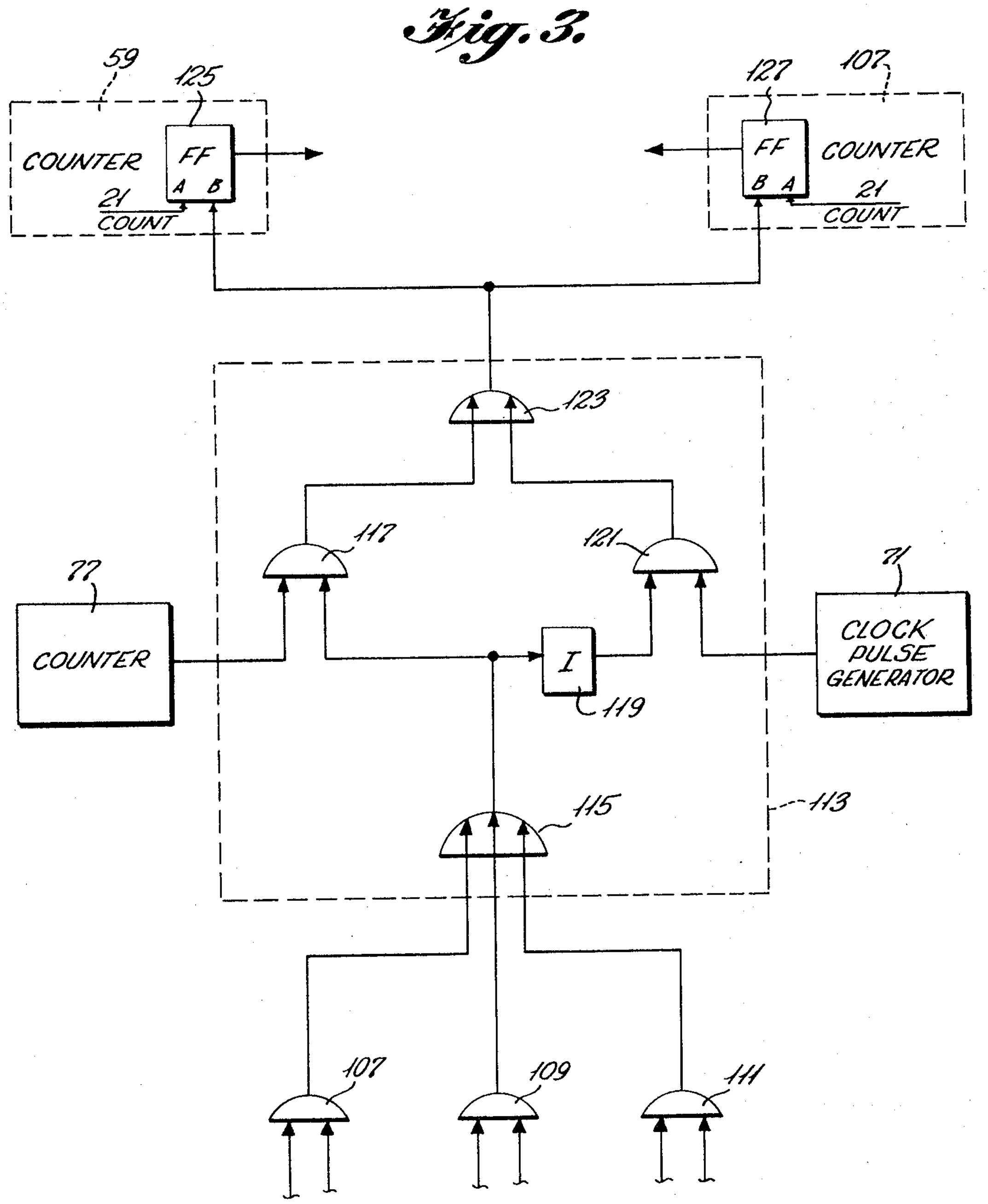
FIG. 3 is a block diagram illustrating a portion of the buffer storage system shown in FIG. 2 in block form.

FIG. 3 illustrates the details of the data transfer responsive circuit and how it can control the counters 59 and 107 to delay their output pulses when data is being transferred between shift registers. As shown in FIG. 3 the output from the gates 108, 109 and 111 are applied through an OR gate 115 to a gate 117. The output pulses produced by the counter 77 are also applied to the gate 117. Thus, whenever data is being transferred between shift registers the gate 117 will receive an enabling signal from one of the gates 108, 109 or 111 and pass any applied pulse from the counter 77.

The output of the OR gate 115 is also inverted by an inverter 119 and applied to a gate 121. The inverter 119 will apply an enabling signal to a gate 121 whenever no signal is received from any of the gates 108, 109 or 111. Thus, the gate 121 will be enabled whenever data is not being transferred between shift registers. The 250 cycle clock pulse generator 71 applies pulses to the gate 121, which pulses will pass through the gate 121 whenever data is not being transferred between shift registers.

The output of the gate 117 and the output of the gate 121 are applied through an OR gate 123 to the counters 59 and 108. The counter 59 includes a flipflop 125 which the counter 59 switches to its A state when the counter 59 reaches a count of 21 and recycles to zero. Then when a pulse passes through the OR gate 123, the flipflop 125 is enabled, the clock pulses produced by the pulse generator 71 will be passing through the gate 121 and through the OR gate 123 to the flipflop 125 to set the flipflop 125 back to its B state immediately after it is set to its A state by the counter 59 reaching a count of 21. Thus, the counter 59 will produce an output pulse immediately after reaching a count of 21 when data is not being transferred between shift registers.

On the other hand, if data is being transferred between shift registers, the gate 117 will be enabled and the gate 121 will not be enabled. Accordingly, when the counter 59 reaches a count of 21 and set the flipflop 125 to its A state, the flipflop 125 will not be set back to its B state until the counter 77 produces an output pulse. The counter 77 will not produce an output pulse until the transfer of data between shift registers is completed and thus the counter 59 will not produce an output pulse until the transfer of data between shift registers has been completed.

The counter 107 also is provided with a flipflop 127, which it sets to its A state when the counter 107 reaches a count of 21 and recycles to zero. The output pulses passing through the OR gate 123 are applied to the flipflop 127 to set the flipflop 127 back to its B state and the counter 107 does not produce an output pulse until the flipflop 127 is set back to its B state. Thus, the counter 107 will operate like the counter 59 and produce an output pulse immediately after reaching a count of 21 if data is not being transferred between shift registers, but it will not produce an output pulse until after the transfer of data is completed if data is being transferred between shift registers.

While data is being read out of the shift register 89, some data may be received by the shift register 53 and the shift register 53 may be partly filled when the stopping of the tape is initiated. Thus, technically the stopping of the tape is initiated when the number of bits in just a portion of the buffer storage drops to a predetermined value rather than in the whole buffer storage unit.

As pointed out above, while the tape is being decelerated to a stop, some bits will be read out of the shift register 89. Thus, when the tatpe is started up again when the shift register 79 fills, the shift register 89 will not be completely filled. Moreover, the number of bits left in the shift register 89 cannot be precisely predicted. Nevertheless, the starting of the tape is in response to the amount of data in the shift register rising to a predetermined value, since the value to which the number of bits in the shift register must rise to start the tape is predetermined by the number of bits that are left in the shift register 89 after the tape has decelerated to a stop.

The system described in FIG. 2 illustrates the operation for one channel of data. The remaining channels of data will be identical to the channel of data demonstrated in FIG. 2 except that all of the logic circuitry of FIG. 2, as well as that shown in FIG. 3, with the exception of the shift registers 53, 69, 79 and 89, is common to all the channels of data so that only one set of this logic circuitry is provided instead of 6 sets.

The above-described system thus constitutes a digital magnetic transport which can accept information for recording at random times and yet which can accept information at a much faster rate than the incremental tape transports of the prior art. Moreover, this random recording with a high acceptance rate is achieved without undesirable gaps in recorded data appearing on the tape.

It will be apparent that the number of shift registers in the buffer register may be increased so as to increase the capacity of the buffer register. Such increased capacity might be desirable if the recording program should require inter-record gaps to be provided in the information recorded on the tape. The increased capacity in the buffer storage would permit data to be accepted during the times that such inter-record gaps were being generated. This and many other modifications may be made to above-described specific embodiment of the invention without departing from the spirit and scope of the invention, which is defined in the appended claims.

What is claimed is:

1. A digital information recording system comprising buffer storage means for storing applied digital data, a recording tape, means to control the motion of said tape in accordance with the amount of digital data in said buffer storage means including means to start the movement of said tape in response to the amount of data in at least a portion of said buffer storage means increasing to a first predetermined value and means to stop the movement of said tape in response to the amount of data in at least a portion of said buffer storage means dropping to a second predetermined value, and transfer means to read the digital data out of said buffer storage means sequentially and record said data on said tape while said tape is moving, said buffer storage means comprising means to store a plurality of applied binary bits and said transfer means comprising read-out means to read one binary bit out of said buffer storage means for each increment of travel of said recording tape and recording means to record binary bits on said recording tape as they are read out of said buffer storage means.

2. A digital recording system as recited in claim 1 wherein said read-out means reads said binary bits out of said buffer storage means in the order in which they are applied to said buffer storage means.

3. A digital recording system as recited in claim 1 wherein said read-out means comprises pulse generating means to generate a pulse for each increment of travel of said recording tape and means to read a binary bit out of said buffer storage unit in response to each pulse produced by said pulse generating means.

4. A digital recording system as recited in claim 1 wherein said buffer storage means comprises a plurality of shift registers arranged in sequence including a first shift register to accept binary bits as they are applied to said buffer storage means and a last shift register to feed said binary bits to said recording means as they are read out of said buffer storage means, and means to transfer the binary bits from said first shift register to said last shift register.

5. A digital recording system as recited in claim 4 wherein said means to transfer the binary bits from said first shift register to said last shift register includes at least a third shift register connected between said first shift register and said last shift register.

6. A digital recording system as recited in claim 5 wherein said means to control motion of said tape starts the movement of said tape when said third shift register becomes and remains filled with binary bits and stops said tape when said third shift register becomes and remains empty of binary bits.

7. A digital information recording system comprising buffer storage means for storing applied digital data, a recording tape, means to control the motion of said tape in accordance with the amount of digital data in said buffer storage means including means to start the movement of said tape in response to the amount of data in at least a portion of said buffer storage means increasing to a first predetermined value and means to stop the movement of said tape in response to the amount of data in at least a portion of said buffer storage means dropping to a second predetermined value, and transfer means to read the digital data out of said buffer storage means sequentially and record data on said tape while said tape is moving, said buffer storage means comprising means to store a plurality of multi-bit binary characters and said tarnsfer means comprises read-out means to read-out one binary character from said buffer storage means for each increment of travel of said recording tape and means to record the binary characters on said recording tape as the binary characters are read out of said buffer storage means.

8. A digital recording system as recited in claim 7 wherein said read-out means reads said binary characters out of said buffer storage means in the order in which they are applied to said buffer storage means.

9. A digital recording system as recited in claim 7 wherein said read-out means comprises pulse generating means to generate a pulse for each increment of travel of said tape and means to read a character out of said buffer storage means in response to each pulse produced by said pulse generating means.

10. A digital recording system as recited in claim 7 wherein said buffer storage means comprises a plurality of sets of shift registers arranged in sequence including a first set of shift registers to accept the binary characters as they are applied to said buffer storage means and a last set of shift registers to feed said binary characters to said recording means as they are read out of said buffer storage means, and means to transfer said binary characters from said first set of shift registers to said last set of shift registers.

11. A digital recording system as recited in claim 10 wherein said means to transfer characters from said first set of shift registers to said last set of shift registers includes a third set of shift registers connected between said first set of shift registers and said last set of shift registers.

12. A digital recording system as recited in claim 11 wherein said means to control the motion of said tape starts the movement of said tape when said third set of shift registers has become and remains filled with characters and stops the movement of said tape when said third set of shift registers become and remain empty of characters.

13. A digital information recording system comprising buffer storage means for storing applied digital data, a recording tape, means to control the motion of said tape in accordance with the amount of digital data in said buffer storage means including means to start the movement of said tape in response to the amount of data in at least a portion of said buffer storage means increasing to a first predetermined value and means to stop the movement of said tape in response to the amount of data in at least a portion of said buffer storage means dropping to a second predetermined value, and transfer means to read the digital data out of said buffer storage means sequentially and record said data on said tape while said tape is moving, said second predetermined value being large enough to supply data to be recorded during the entire time that the tape is decelerating to a stop in response to the amount of data in said buffer storage means dropping to said second predetermined value.

14. A digital information recording system comprising a plurality of registers arranged in sequence, means to read information into the first register in said sequence, means responsive to any succeeding one of said registers in said sequence being empty and the register preceding such succeeding register in said sequence being full of data to transfer the data from such preceding register to such succeeding register, a recording tape, and means reponsive to a predetermined number of the registers at the end of said sequence being full to transfer the data out of the last register in said sequence and record such data on said tape.

15. A buffer storage device comprising a plurality of registers arranged in sequence, the first and last registers of said sequence comprising shift registers, means to read data serially into said first register in said sequence and serially out of said last register in said sequence, and means responsive to any succeeding one of said registers in said sequence being empty and the register preceding such succeeding register in said sequence being full to transfer the data from such preceding register to such succeeding register.

16. A buffer storage device comprising a plurality of registers arranged in sequence, said registers comprising shift registers each having a front end and a back end, means to read data into the first register in said sequence and out of the last register in said sequence, and means responsive to any succeeding one of said registers in said sequence being empty and the register preceding such register in said sequence being full to transfer the data from such preceding register to such succeeding register by serially shifting the data out of the back end of such preceding register and into the front end of such succeeding register.

References Cited

UNITED STATES PATENTS

| | | | |
|---|---|---|---|
| 3,117,307 | 1/1964 | Davie ___________ | 328—37 XR |
| 3,293,613 | 12/1966 | Gabor __________ | __340—172.5 |
| 3,302,180 | 1/1967 | Donohoe et al. _____ | 340—172.5 |

ROBERT C. BAILEY, *Primary Examiner.*

RAULFE B. ZACHE, *Assistant Examiner.*

U.S. Cl. X.R.

340—174.1

PO-1050
(5/69)

UNITED STATES PATENT OFFICE
CERTIFICATE OF CORRECTION

Patent No. 3,454,930 Dated July 8, 1969

Inventor(s) Robert E. Schoeneman

It is certified that error appears in the above-identified patent and that said Letters Patent are hereby corrected as shown below:

Column 7, line 20, change "couner" to --counter--;
line 26, change "regiser" to --register--.
Column 8, line 33, after "flipflop 125 is" insert the following: --switched back to its B state. The counter 59 produces the output pulse as a result of the flipflop 125 being switched back to its B state. Thus, whenever data is not being transferred between shift registers so that the gate 121 is--;
line 75, change "tatpe" to --tape--.

SIGNED AND
SEALED
MAR 17 1970

(SEAL)
Attest:

Edward M. Fletcher, Jr.
Attesting Officer

WILLIAM E. SCHUYLER, JR
Commissioner of Patents